United States Patent Office 2,731,491
Patented Jan. 17, 1956

2,731,491

CONDENSATION PRODUCT OF NAPHTHENIC ACIDS AND PHENOLS AND METHODS OF MAKING SAME

Oliver L. Brandes, Gibsonia, and Earl L. Humphrey, Penn Township, Allegheny County, Pa., assignors to Gulf Research & Development Company, Pittsburgh, Pa., a corporation of Delaware No Drawing. Application April 2, 1953,
Serial No. 346,541

12 Claims. (Cl. 260—468)

This invention relates to new compounds and to methods of making such compounds.

We have discovered, in accordance with the invention, that valuable new compounds can be prepared by reacting a mixture comprising naphthenic acids and at least one phenol in the presence of a Friedel-Crafts catalyst such as aluminum chloride, aluminum chloride-containing compounds or complexes, aluminum bromide, aluminum iodide, ferric chloride, antimony trichloride, antimony pentachloride, zinc chloride, zinc fluoride, tin chloride, boron trifluoride, titanium chloride, zirconium chloride, and the like, at an elevated temperature of at least about 200° F. for a time sufficient to effect reaction between the naphthenic acids and the phenol.

The phenols which may be employed in our invention in the reaction with naphthenic acids include monocyclic phenols, as well as derivatives thereof, and polycyclic phenols such as naphthols and bis-phenols.

The phenols which are preferred in accordance with the invention are monocyclic phenols, such as a phenol itself, and derivatives of phenol, which are free of substituents which adversely affect the course of the reaction. Especially advantageous phenols for use in the present process are alkylated phenols, particularly such phenols in which the alkyl groups are lower alkyl groups such as methyl, ethyl, propyl, isobutyl and the like. For example, advantageous results have been obtained in accordance with the invention with the use of cresols, and especially p-cresol. The class of phenols preferred for use in accordance with my invention may be represented by the following general formula:

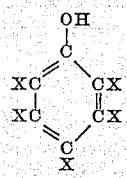

wherein X is selected from the group consisting of hydrogen and alkyl groups having from one to 12 carbon atoms, with the number of hydrogen atoms per molecule being at least one and preferably two.

While the above class of phenols are preferred in reactions with naphthenic acids in accordance with our invention, we may also employ other phenolic-type compounds in reactions with the naphthenic acids. Thus naphthols having the following structural formula may be used:

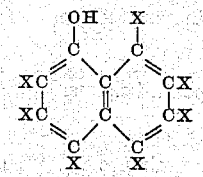

where X is selected from the group consisting of hydrogen and alkyl groups having from one to 12 carbon atoms, with the number of hydrogen atoms per molecule being at least one and preferably two. In addition bis-phenols having the following structural formula may be employed:

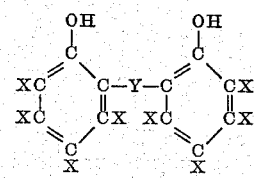

where X is selected from the group consisting of hydrogen and alkyl groups having from one to 12 carbon atoms, with the number of hydrogen atoms in each ring being at least one and preferably two, and Y=S, —S—S— or

where R and R' may be hydrogen, alkyl, aryl, cocloalkyl, alkaryl, or aralkyl. In reactions where the above naphthols or bis-phenols are employed, a mol of the naphthols or bis-phenols may be reacted with from one to 2 mols of naphthenic acids to obtain the desired reaction product.

While any of the available naphthenic acids can be employed in the practice of our invention, we prefer to employ naphthenic acids having the following characteristics:

| | |
|---|---|
| Neutralization number | 100 to 275 |
| Saponification number | 100 to 300 |
| Molecular weight | 200 to 500 |

Dicyclic as well as dicarboxylic naphthenic acids can be employed in the reaction of our invention. We have found that for best results monocyclic monocarboxylic naphthenic acids are preferred.

While we are not aware of the exact structure of the reaction product so obtained in accordance with our invention, we have found, nevertheless, that in order to obtain the new compounds of our invention, it is important that the temperature during the reaction be at least about 200° F. Substantially higher temperatures can be used provided they are not so high as to initiate charring reactions. We have found that best results are obtained by conducting the reaction at a temperature of about 300° F. to about 375° F.

In one method of practicing our invention, a mixture comprising naphthenic acids, a phenol, a Friedel-Crafts catalyst and an organic solvent is stirred and kept at slow reflux at an elevated temperature for a time sufficient to effect reaction between the naphthenic acids and the phenol. Any conventional organic solvent that does not adversely affect the course of the reaction may be employed as a solvent in such reaction. Examples of organic solvents which may be used are Stoddard solvent, hexane and other similar aliphatic-type solvents.

In obtaining the new compounds of our invention, we have found that the presence of an organic solvent is not necessary, although advantageous, as it permits ease of operation and ordinarily yields an excellent product. As an example of operating in the absence of an organic solvent, the necessary amount of Friedel-Crafts catalyst may be added to a mixture comprising naphthenic acids and a phenol over a period of time and at a temperature substantially above room temperature, and the resulting mixture is then heated at a temperature substantially above room temperature for a time sufficient to effect reaction between the naphthenic acids and the phenol.

In preparing the new compounds of our invention, we have found that the amounts of reactants necessary to obtain the desired reaction products are not critical and may be varied over a wide range, although we prefer to employ for best results about 1 mol of naphthenic acids to about 1 to 2.7 mols of phenols. The amount of Friedel-Crafts catalyst needed is similarly not critical and need only be present in an amount sufficient to catalyze the condensation reaction. Generally about 0.05 to 0.25 mol of catalyst per mol of reactants has been found to provide good results.

The products of this invention may advantageously be employed as chemical intermediates in the manufacture of detergents for mineral oils and in the preparation of greases.

The following example illustrates one method of obtaining the new compounds of our invention.

EXAMPLE 1

A mixture comprising 400 grams of naphthenic acids having a molecular weight of about 292, 400 grams of p-cresol, 64 grams of aluminum chloride and 1500 milliliters of Stoddard solvent was stirred and kept at slow reflux for five hours at a temperature of about 300° to about 375° F. at atmospheric pressure, after which the reaction mixture was poured into ice and concentrated hydrochloric acid to decompose the catalyst complex. The Stoddard solvent layer was first washed with 10–15% hydrochloric acid several times to remove aluminum compounds and then with water until neutral. The Stoddard solvent was removed by steam distillation, leaving a brown, tacky solid reaction product having a molecular weight of 427. Several additional runs were similarly made in which either the amounts of the reactants used were varied or the substituted phenols employed were changed. The results of each of these runs are tabulated below in Table I.

reaction product having a neutralization value of 46 and a saponification number of 171.8 and consisting of 75.95 per cent carbon and 10.00 per cent hydrogen.

While we have shown in Example 5 the reaction of p-cresol with naphthenic acids in the presence of aluminum chloride catalyst, we have found that other substituted phenols may also be employed in place of p-cresol under substantially identical operating conditions to obtain the desired intermediates of our invention. Examples of substituted phenols which have been found to be satisfactory in reactions similar to Example 5 are isopropylphenol, cresol C (a mixture containing 43 per cent meta-cresol, 24 per cent para-cresol, 14 per cent phenol, 8 per cent ortho-cresol, and 10 per cent low boiling xylenols), cresylic acid X–1 (a mixture containing 60 per cent low boiling xylenols, 17 per cent meta-cresol, 10 per cent para-cresol, 10 per cent high boiling xylenols, and 2 per cent phenol) and cresylic No. 2 (a mixture containing 90 per cent high boiling xylenols and acids boiling above xylenols and 7 per cent low boiling xylenols).

Each of the reaction products obtained as a result of the reactions between the various substituted phenols and naphthenic acids under conditions similar to those set forth in Example 5 can be converted into oil-soluble salts, such as a nickel salt, of fairly high ash content, that may be employed as a detergent for mineral oils.

The following example illustrates the preparation of the new compounds of our invention by using phenols with higher molecular weight side chains than those disclosed hereinabove.

EXAMPLE 6

800 grams of naphthenic acids having a molecular

*Table I*

| Example No. | 1 | 2 | 3 | 4 |
|---|---|---|---|---|
| Reactants: | | | | |
| Naphthenic Acids, gms. | 400 (1.37 mols) | 585 (2 mols) | 585 (2 mols) | 400 (1.37 mols). |
| p-Cresol, gms. | 400 (3.7 mols) | 216 (2 mols) | | |
| m-Cresol, gms. | | | 216 (2 mols) | |
| 2,6-di-tertiary-butyl-4-methyl phenol, gms. | | | | 400 (1.82 mols). |
| Aluminum Chloride, gms. | 64 | 64 | 64 | 64. |
| Stoddard Solvent, ml. | 1,500 | 1,500 | 1,500 | 1,500. |
| Reflux Time, hrs. | 5 | 5 | 5 | 4. |
| Crude Product Properties: | | | | |
| Analysis— | | | | |
| C,[1] Percent | 74.3 | 74.5 | 76.0 | 77.9. |
| H,[1] Percent | 10.8 | 11.7 | 11.1 | 11.0. |
| Molecular Weight [1] | 427 | 305 | 273 | 309. |
| Neutralization No. (ASTM D–663) | 7.74 | 55.7 | 157 | 72.6. |
| Saponification No. (ASTM D–94) | 166.3 | 161.3 | 180.4 | 122.1. |

[1] Micro-analysis.

The products obtained in Examples 1 and 2 were brown, tacky solids having high saponification numbers. Although the product prepared using equal weights of naphthenic acids and p-cresol (Example 1) had a low neutralization number, it may still be employed to produce metal salts, such as a nickel salt.

The following example illustrates a method of obtaining the new compounds of our invention in the absence of an organic solvent.

EXAMPLE 5

A mixture comprising 800 grams of naphthenic acids having a molecular weight of about 263 and 328 grams of p-cresol was heated to a temperature of 300° F., and 90.2 grams of aluminum chloride were slowly added to the mixture over a period of 1½ hours, during which addition the temperature varied from 300° to 310° F. The reaction mixture was then stirred for 3 additional hours at a temperature of 350° F., at the end of which time the reaction mixture was poured into ice and concentrated hydrochloric acid, extracted with benzene, washed until the water wash was neutral, and the benzene removed by distillation, leaving 896 grams of the weight of about 263 and 624 grams of octyl phenol were heated to a temperature of 300° F., and 91 grams of aluminum chloride were slowly added to the mixture over a period of 1½ hours at a temperature of 308° to 320° F. This mixture was heated and stirred for 3 additional hours at a temperature of 350° F., at the end of which time the reaction product was poured into ice and concentrated hydrochloric acid, extracted with benzene, washed until the wash water was neutral and the benzene removed by distillation, leaving 1272 grams of the reaction product having a neutralization value of 50.8 and a saponification number of 119.0 and consisting of 77.59 per cent carbon and 11.09 per cent hydrogen.

Obviously, many modifications and variations of the invention, as hereinabove set forth, may be made without departing from the spirit and scope thereof, and therefore only such limitations should be imposed as are indicated in the appended claims.

We claim:

1. A method of preparing a new compound, which comprises reacting a mixture comprising naphthenic acids and at least one phenol in the presence of a Friedel-Crafts catalyst at an elevated temperature of at least about 200° F. for a time sufficient to effect reaction between the naphthenic acids and the phenol.

2. A method of preparing a new compound, which comprises reacting a mixture comprising naphthenic acids and at least one phenol having the following structural formula:

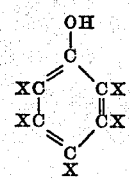

wherein X is selected from the group consisting of hydrogen and alkyl groups having from one to 12 carbon atoms, with the number of hydrogen atoms per molecule being at least one, in the presence of a Friedel-Crafts catalyst at an elevated temperature of at least about 200° F. for a time sufficient to effect reaction between the naphthenic acids and the phenol.

3. A method of preparing a new compound, which comprises refluxing a mixture comprising naphthenic acids, at least one phenol, and an organic solvent in the presence of a Friedel-Crafts catalyst at an elevated temperature of at least about 200° F. for a time sufficient to effect reaction between the naphthenic acids and the phenol.

4. A method of preparing a new compound, which comprises slowly adding, over a period of time, to a mixture comprising naphthenic acids and at least one phenol, a Friedel-Crafts catalyst at an elevated temperature of at least about 200° F. and refluxing the resulting mixture to effect reaction between the naphthenic acids and the phenol.

5. A method of preparing a new compound, which comprises reacting a mixture comprising naphthenic acids and p-cresol in the presence of a Friedel-Crafts catalyst at an elevated temperature of at least about 300° F. for a time sufficient to effect reaction between the naphthenic acids and p-cresol.

6. A method of preparing a new compound, which comprises reacting a mixture comprising naphthenic acids and m-cresol in the presence of a Friedel-Crafts catalyst at an elevated temperature of at least about 300° F. for a time sufficient to effect reaction between the naphthenic acids and m-cresol.

7. A method of preparing a new compound, which comprises reacting a mixture comprising naphthenic acids and 2,6-di-tertiary-butyl-4-methyl phenol in the presence of a Friedel-Crafts catalyst at an elevated temperature of at least about 300° F. for a time sufficient to effect reaction between the naphthenic acids and the 2,6-di-tertiary-butyl-4-methyl phenol.

8. As a new compound, the product resulting from claim 1.

9. As a new compound, the product resulting from claim 2.

10. As a new compound, the product resulting from claim 5.

11. As a new compound, the product resulting from claim 6.

12. As a new compound, the product resulting from claim 7.

No references cited.